United States Patent
Kim et al.

(10) Patent No.: US 8,799,733 B2
(45) Date of Patent: *Aug. 5, 2014

(54) PACKET DATA TRANSMITTING METHOD AND MOBILE COMMUNICATION SYSTEM USING THE SAME

(75) Inventors: Bong Hoe Kim, Gyeonggi-Do (KR); Joon Kui Ahn, Seoul (KR); Hak Seong Kim, Seoul (KR); Dong Wook Roh, Seoul (KR); Dong Youn Seo, Seoul (KR); Seung Hwan Won, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1278 days.

This patent is subject to a terminal disclaimer.

(21) Appl. No.: 12/622,217

(22) Filed: Nov. 19, 2009

(65) Prior Publication Data

US 2010/0061332 A1 Mar. 11, 2010

Related U.S. Application Data

(63) Continuation of application No. 12/130,884, filed on May 30, 2008, now Pat. No. 8,615,696, which is a continuation of application No. 11/121,908, filed on May 3, 2005, now Pat. No. 7,394,790.

(30) Foreign Application Priority Data

May 4, 2004 (KR) .................. 10-2004-0031373

(51) Int. Cl.
*H04L 1/18* (2006.01)

(52) U.S. Cl.
USPC .......................................... 714/748; 714/774

(58) Field of Classification Search
CPC ............................ H04L 1/1822; H04L 1/1858
USPC ................................................. 714/748, 774
See application file for complete search history.

(56) References Cited

U.S. PATENT DOCUMENTS 6,434,396 B1 * 8/2002 Rune ............................. 455/502
6,971,050 B1 11/2005 Dhbuchi et al.
(Continued)

FOREIGN PATENT DOCUMENTS

| | | |
|---|---|---|
| CN | 1330842 | 1/2002 |
| CN | 1336771 | 2/2002 |

(Continued)

OTHER PUBLICATIONS

UMTS Handover; Aug. 30, 2002; XP-002560326; retrieved from ,URL:http://web.archive.org/web/20021018215346/http://www.umstworld.com/tec.

(Continued)

*Primary Examiner* — M. Mujtaba K Chaudry
(74) *Attorney, Agent, or Firm* — Lee, Hong, Degerman, Kang & Waimey

(57) ABSTRACT

A packet data transmitting method and mobile communication system using the same enables transmission of common ACK/NACK information from each sector of a base station to a user entity in softer handover. The method includes receiving via at least one of the plurality of sectors a data packet from the mobile terminal, the data packet being correspondingly received for each of the at least one of the plurality of sectors; combining the correspondingly received data packets, to obtain a signal having a highest signal-to-noise ratio; decoding the value obtained by the combining; determining a transmission status of the data packet according to the decoding; and transmitting to the mobile terminal a common ACK/NACK signal including one of a common ACK signal and a common NACK signal according to the determining, the common ACK/NACK signal being transmitted via each of the at least one sector.

6 Claims, 3 Drawing Sheets

(56) References Cited

U.S. PATENT DOCUMENTS

| | | | |
|---|---|---|---|
| 2002/0154610 A1 | 10/2002 | Tiedemann et al. | |
| 2003/0110435 A1* | 6/2003 | Wu et al. | 714/748 |
| 2003/0126238 A1* | 7/2003 | Kohno et al. | 709/220 |
| 2003/0171118 A1 | 9/2003 | Miya | |
| 2003/0174662 A1 | 9/2003 | Malkamaki | |
| 2004/0215753 A1* | 10/2004 | Chan et al. | 709/223 |
| 2004/0219917 A1* | 11/2004 | Love et al. | 455/436 |
| 2004/0258096 A1* | 12/2004 | Yoon et al. | 370/498 |
| 2005/0181834 A1 | 8/2005 | Chen et al. | |
| 2005/0201337 A1 | 9/2005 | Heo et al. | |
| 2005/0246617 A1 | 11/2005 | Kyung et al. | |
| 2008/0080470 A1 | 4/2008 | Yano et al. | |

FOREIGN PATENT DOCUMENTS

| | | |
|---|---|---|
| CN | 1465203 | 12/2003 |
| CN | 1386336 | 12/2012 |
| EP | 1207709 | 5/2002 |
| EP | 1655863 | 5/2006 |
| JP | 2002152843 | 5/2002 |
| KR | 10-2002-0000514 | 1/2002 |
| WO | 0004728 | 1/2000 |
| WO | 0013426 | 3/2000 |
| WO | 0201746 | 1/2002 |
| WO | 02058312 | 7/2002 |
| WO | 02065797 | 8/2002 |
| WO | 03/069807 | 8/2003 |
| WO | 03067953 | 8/2003 |
| WO | 03/088515 | 10/2003 |

OTHER PUBLICATIONS

3rd Generation Partnership Project (3GPP), "Technical Specification Group Radio Access Network; Manifestations of Handover and SRNS Relocation (Release 4)," 3GPP TR 25.832 v4.0.0, Mar. 2001.

Lin, et al., "Error Control Coding: Fundamentals and Applications", Chapter 15.4, pp. 477-481 (relevant pages: pp. 477-478), 1983.

European Patent Office Application Serial No. 05740146.5, Search Report dated Oct. 22, 2013, 3 pages.

* cited by examiner

PACKET DATA TRANSMITTING METHOD AND MOBILE COMMUNICATION SYSTEM USING THE SAME

This application is a continuation of U.S. application Ser. No. 12/130,884, filed on May 30, 2008, now U.S. Pat. No. 8,615,696, which is a continuation of U.S. application Ser. No. 11/121,908, filed on May 3, 2005, now U.S. Pat. No. 7,394,790, which claims the benefit of earlier filing date and right of priority to Korean Application No. 10-2004-0031373 filed on May 4, 2004, the contents of which are all hereby incorporated by reference herein in their entirety.

BACKGROUND OF THE INVENTION

1. Field of the Invention

The present invention relates to packet data transmission in a mobile communication system.

2. Discussion of the Related Art

Currently, high-speed downlink packet transport in a mobile communication system uses hybrid automatic repeat request (HARQ) transmission schemes, which apply channel coding to ARQ techniques, and adaptive modulation and coding (AMC), which achieves an optimal data rate by varying the modulation order and coding rate according to a current channel status. In a system adopting ARQ transmission, erroneous packets are detected at the receiving side and retransmitted according to an ACK/NACK signal fed back to the transmitting side in correspondence with each packet transfer. The feedback signal is either an acknowledgement (ACK) signal for confirming a successful instance of packet transmission or a negative acknowledgement (NACK) signal for confirming an unsuccessful instance of packet transmission. After checking the received data packets and detecting an erroneous packet, the ARQ system discards the erroneous packet, which is then wholly replaced by a retransmitted packet, but a HARQ system preserves the erroneous packet, which is combined with a correspondingly retransmitted packet, thereby achieving increased diversity gain and coding gain. While delays in the ARQ system occur when the ACK/NACK signal is transmitted by high layer signaling, the delay in the HARQ system is caused by the ACK/NACK signal being transmitted by physical layer signaling.

ARQ techniques include the stop-and-wait (SAW) method, in which a new packet is transmitted only after receiving the previous ACK/NACK signal, the go-back-N (GBN) method, in which packet transmission continues for a number of packets and a retransmission is performed for N packets preceding reception of a NACK signal, and the selective repeat (SR) method, in which only erroneous packets are retransmitted. Although implementation of the stop-and-wait method is simple, data transport efficiency suffers since each new packet must await ACK/NACK signal reception. The go-back-N method improves transport channel efficiency but is more complicated to implement. In the selective repeat method, which is the most complicated since the transmitted packets require rearrangement on the receiving side to recover their original sequencing, transport channel efficiency can be maximized.

Meanwhile, HARQ transmission schemes also retransmit a previously transmitted packet in the event of an error being present (detected) in the packet. HARQ systems, whereby a signal-to-noise ratio is increased to enable improved transport efficiency, include the chase combining (CC) method to achieve higher signal-to-noise ratios through time diversity and the incremental redundancy (IR) method to achieve higher signal-to-noise ratios through coding diversity. Chase combining employs multiple channels to transmit the packets, such that a channel for retransmission packets in the event of packet error detection differs from the channel used for previously transported packets. Each retransmission of a packet using incremental redundancy, on the other hand, applies a different (incremented) redundancy. Thus, incremental redundancy is characterized in that one packet is transported with various versions, such that if transmission of a packet of a first version fails, the packet is transmitted as a second or third version. For example, for a code rate of ⅓, a transmitted packet x can be sent as three versions, namely, $x_1$, $x_2$, or $x_3$, but for a code rate of ½, the transmitted packets include versions $x_1$ and $x_2$. Assuming that, at a code rate of ½, a transmission of versions $x_1$ and $x_2$ each fails, a transmitter can send another two versions, namely, $x_2$ and $x_3$. Hence, from the viewpoint of the receiving side, the ½ code rate is changed to a code rate of ⅓.

HARQ is applicable for packet transmission in an uplink, i.e., a user entity transmitting to a base station. When the user entity communicates with multiple base stations, as in the case of a soft handover, each of the base stations determines the presence or absence of an error in the transmitted packet and accordingly transmits an ACK/NACK signal in a downlink. Thus, if each of the base stations transmits an ACK/NACK signal to the user entity, the user entity detects multiple ACK/NACK signals coming from the various base stations. Under softer handover conditions, however, where the user entity moves between the sectors of a single cell, one base station receives multiple transmissions of the same packet, which is transmitted from the user entity to each of the sectors and is then separately transferred from each sector to the base station. Hence, if transmission status at the receiving side, i.e., the state of an ACK/NACK signal to be transmitted by a downlink, is determined by decoding the packets transmitted via the respective sectors and in turn each of the sectors transmits the ACK/NACK signal to the user entity, the efficiency of ACK/NACK signal transmission is lowered.

SUMMARY OF THE INVENTION

Accordingly, the present invention is directed to a packet data transmitting method and mobile communication system using the same that substantially obviate one or more problems due to limitations and disadvantages of the related art.

An object of the present invention is to provide a packet data transmitting method and mobile communication system using the same, by which common data transmission success/failure (ACK/NACK) information can be transmitted from each sector of a base station to a user entity in softer handover.

Another object of the present invention is to provide a packet data transmitting method and mobile communication system using the same, which reduces ACK/NACK signaling errors.

Another object of the present invention is to provide a packet data transmitting method and mobile communication system using the same, which enables improved channel efficiency when using a dedicated channel for ACK/NACK transmission.

Another object of the present invention is to provide a packet data transmitting method and mobile communication system using the same, which can increase data transport rates.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a method of transmitting packet data in a mobile communication system including a base station having a plurality of sectors and a mobile terminal in softer handover. The method comprises receiving via at least one of the plurality of sectors a data packet from the mobile terminal, the data packet being correspondingly received for each of the at least one of the plurality of sectors; combining the correspondingly received data packets, to obtain a signal having a highest signal-to-noise ratio; decoding the value obtained by the combining; determining a transmission status of the data packet according to the decoding; and transmitting to the mobile terminal a common ACK/NACK signal including one of a common ACK signal and a common NACK signal according to the determining, the common ACK/NACK signal being transmitted via each of the at least one sector.

In another aspect of the present invention, there is provided a method of transmitting a data packet in a mobile communication system including a base station having a plurality of sectors and a mobile terminal in softer handover. The method comprises receiving, by an uplink transmission from the mobile terminal, a corresponding data packet via at least one of the plurality of sectors; maximal-ratio-combining the correspondingly received data packets; decoding a resultant of the maximal-ratio-combining; determining a transmission status of the data packet from the mobile terminal according to the decoding; and transmitting, by a downlink transmission to the mobile terminal, a common ACK/NACK signal including one of a common ACK signal and a common NACK signal according to the determining, the common ACK/NACK signal being transmitted via each of the at least one sector.

Preferably, the data packet is transmitted via an enhanced uplink dedicated channel, and the mobile communication system adopts a hybrid automatic repeat request transmission scheme for the uplink transmission.

In another aspect of the present invention, there is provided a method of confirming success or failure of a packet data transmission in a mobile terminal. The method comprises receiving a plurality of common ACK/NACK signals including one of a common ACK signal indicating the success of packet data transmission and a common NACK signal indicating the failure of packet data transmission, the common ACK/NACK signals being transmitted via radio links from different cells within one active set; combining the plurality of common ACK/NACK signals received from the cells to obtain an ACK/NACK signal having a highest signal-to-noise ratio when the radio links lie within one radio link set; decoding the combined ACK/NACK signal; and determining the success or failure of the packet data transmission according to the decoding.

In another aspect of the present invention, there is provided a mobile communication system comprising a base station having a plurality of sectors and a mobile terminal. The mobile terminal comprises a transmitter for transmitting a data packet to at least one of the plurality of sectors of the base station; a receiver for receiving from the at least one sector a common ACK/NACK signal according to a transmission status of the data packet; a decoder for combining the common ACK/NACK signals received from the at least one sector, to obtain a value having a highest signal-to-noise ratio, and for decoding the obtained value; and a controller for determining whether a transmission of the packet data is successful according to the decoding.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
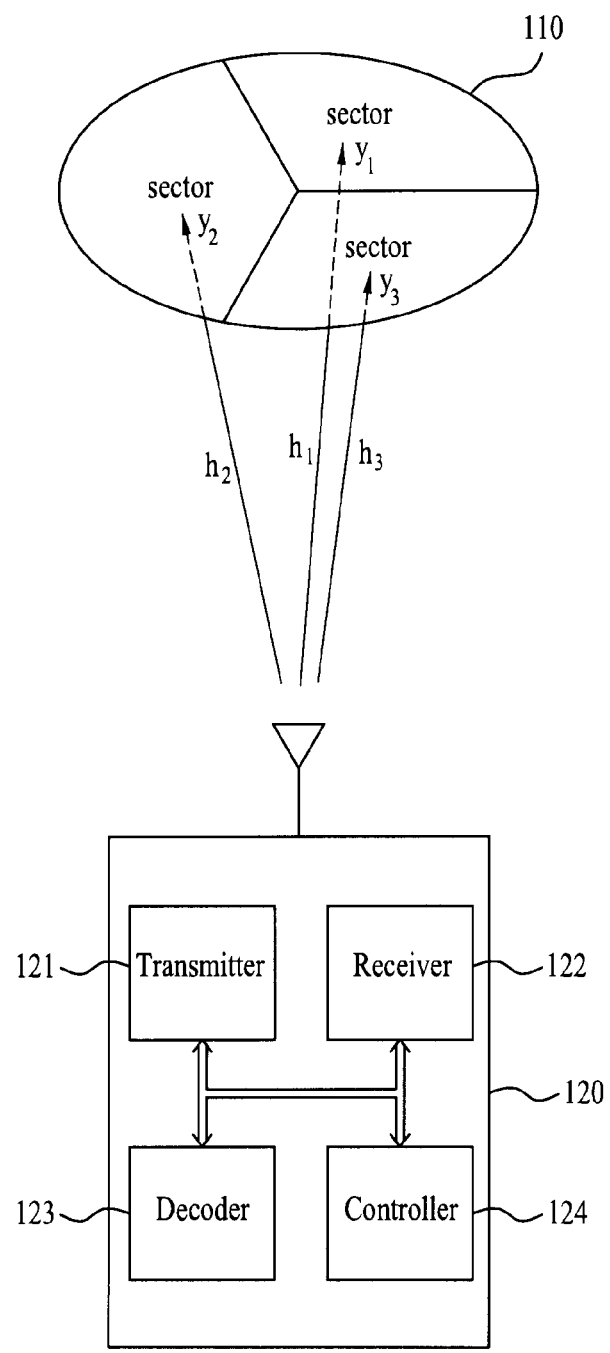
FIG. 1 is a diagram of a mobile communication system according to the present invention.

Reference will now be made in detail to the preferred embodiments of the present invention, examples of which are illustrated in the accompanying drawings. Wherever possible, like reference numbers will be used throughout the drawings to refer to the same or similar parts.

An enhanced uplink dedicated channel (E-DCH) has been proposed as a channel for high-speed data transmission from a user entity (UE) to a base station (Node-B).

In a mobile communication system, a UE in soft handover transmits packet data to a plurality of Node-Bs and receives from each Node-B an ACK/NACK signal indicating whether the packet data transmission was successful. Accordingly, while in soft handover, the UE receives multiple ACK/NACK signals, and the received signals may indicate differing ACK/NACK statuses from one Node-B to another Node-B; namely, one of the Node-Bs may receive and successfully decode a data packet and transmit to the UE an ACK signal while another Node-B fails in receiving or decoding the corresponding data packet and thus transmits to the UE a NACK signal. In doing so, each Node-B of a soft handover receives from the UE the transmitted packet data, determines based on the received packet data whether an unacceptable error has occurred in the transmission, and then transfers or reports to an higher layer (e.g., a radio network controller) information on the determination results for a corresponding data packet. The higher layer uses a "selection combining" technique to determine the transmission status of a UE in soft handover. That is, a determination of successful packet data transmission from a UE in soft handover occurs if at least one of the Node-Bs indicates to the higher layer a successful transmission of a corresponding data packet from the UE, and a determination of transmission failure occurs if none of the Node-Bs indicates a successful transmission.

Meanwhile, apart from the above determination of the higher layer, each of the Node-Bs of a soft handover transmits to the UE an ACK/NACK signal according to its own packet data reception, that is, its own determination of transmission status. The UE side, however, has no capability under soft handover conditions to combine possibly differing ACK/NACK signals from each of the Node-Bs, for example, to ascertain a signal or definitive transmission status during soft handover, and simply detects each of the ACK/NACK signals.

On the other hand, in the case of transiting between sectors of a given cell (within a single Node-B) by a UE in softer handover, the UE differentiates between the sectors and transmits packet data accordingly. Therefore, the Node-B of the softer handover decodes the packet data received per sector and applies a HARQ transmission scheme to transmit to the UE one ACK/NACK signal for each data packet transmitted by the UE.

In an enhanced uplink dedicated channel for uplink high-speed data communication employing a HARQ transmission scheme, the present invention proposes a method of transmitting one common ACK/NACK signal in the downlink while a UE is in softer handover. The common ACK/NACK signal, which is transmitted via each of at least one sector (or cell), includes one of a common ACK signal and a common NACK signal according to a process for determining transmission status based on a detection of the presence or absence of errors in the transmitted packets.

In the present invention, a UE (or mobile terminal) in soft handover may receive, during a transmission time interval of an enhanced uplink dedicated channel, multiple ACK/NACK signals from different cells (or sectors) in the active set (or Node-B). In some cases, such as a softer handover, the UE knows that some of the transmitted ACK/NACK signals are the same, since the radio links are part of the same radio link set. For these cases, ACK/NACK signals from the same radio link set shall be combined to form one instance (e.g., for one packet) of ACK/NACK information, which is then delivered to higher layers.

Referring to FIG. 1, a mobile communication system according to the present invention includes a base station 110 having a plurality of sectors, but assumed herein to have a total of three sectors, and a mobile terminal 120. The mobile terminal 120 includes a transmitter 121 for transmitting the same packet data to at least one of the plurality of sectors of the base station 110, a receiver 122 for receiving a common ACK or NACK signal according to a transmission status of the packet data from the at least one sector of the base station, a decoder 123 for combining the common ACK or NACK signals received from the at least one sector into a signal (or value) having a highest signal-to-noise ratio to decode the corresponding value, and a controller 124 for determining whether transmission of the packet data is successful according to a result of the decoding.

Figures 2A, 2B, 2C:
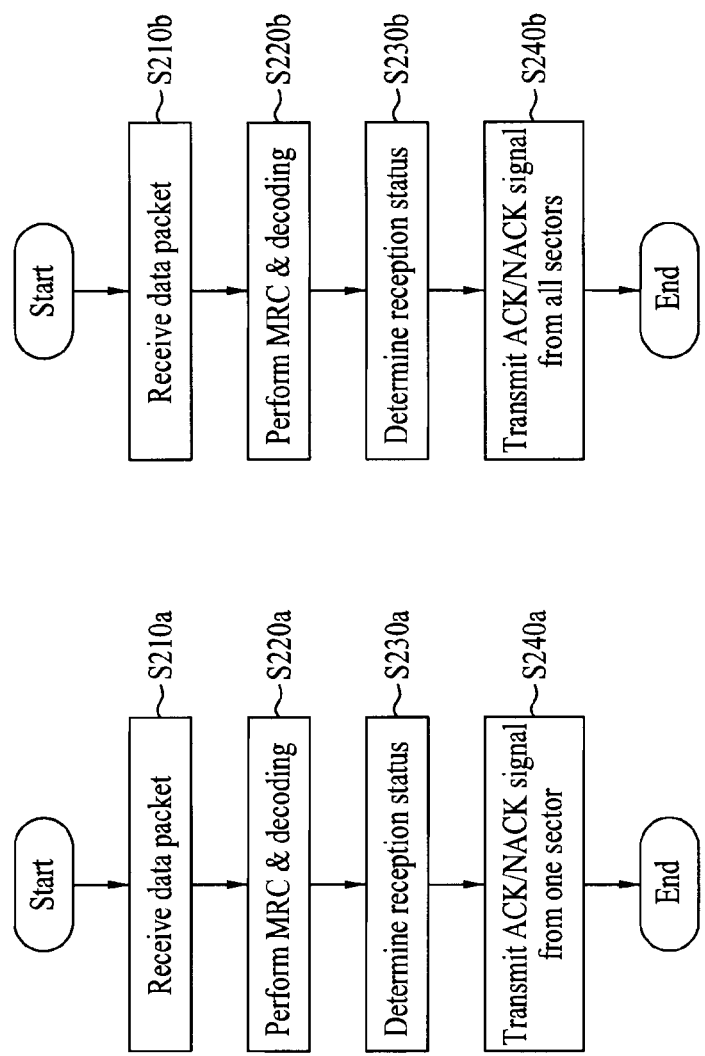
FIGS. 2A, 2B, and 2C are each flowcharts of a method for transmitting packet data in a mobile communication system according to first, second, and third embodiments of the present invention, respectively, whereby a common ACK/NACK signal is transmitted to a user entity in softer handover.
Figure 3:
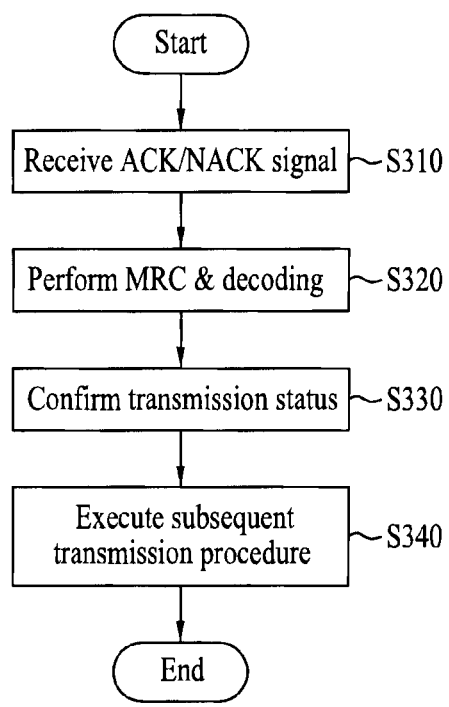
FIG. 3 is a flowchart of a process of receiving at a user entity in softer handover an ACK/NACK signal transmitted according to any one of the methods of FIG. 2A, 2B, or 2C.

Referring to FIG. 2A, during a softer handover, the base station (Node-B) 110 receives a data packet (S210a) transmitted to at least one sector and specifically to each of its active sectors from the mobile terminal (UE) 120 via an enhanced uplink dedicated channel (E-DCH) and performs decoding (S220a) on a packet having a highest signal-to-noise ratio. That is, rather than separately decoding the packet data received via the respective sectors, the base station 110 performs maximal ratio combining (MRC) on the correspondingly received packets to obtain for decoding a packet data value whose signal-to-noise ratio is maximized. Then, according to the decoded resultant, the base station 110 determines its reception status and thus the transmission status (S230a) to thereby generate an ACK/NACK signal, including one of a transmission acknowledgement signal (i.e., an ACK signal) or a transmission negative-acknowledgement signal (i.e., a NACK signal), for confirming the presence or absence of a successful instance of transmission from the mobile terminal 120. The generated signal, as a common ACK/NACK signal, is transmitted by physical layer signaling to the mobile terminal 120 via at least one of the sectors (S240a), and as shown in FIG. 3, the mobile terminal performs maximal ratio combining on the common ACK or NACK signals to obtain the value having the highest signal-to-noise ratio. The base station's use of the physical channel, without reporting to a higher layer, leads to higher data transport rates.

Thus, in the embodiment of FIG. 2A, the ACK/NACK signal is transmitted from the base station 110 to the mobile terminal 120 via just one of the sectors of the base station. On the other hand, in the embodiment of FIG. 2B, regardless of which sectors of the base station 110 receive packets from the mobile terminal 120 (S210b), the common ACK/NACK signal that is generated (S220b, S230b) is transmitted by physical layer signaling via each one of the base station's three sectors (S240b); and in the embodiment of FIG. 2C, according to the sectors of the base station receiving packets from the mobile terminal (S210c), the common ACK/NACK signal that is generated (S220c, S230c) is transmitted by physical layer signaling via only the sector or sectors having received the packet (S240c).

In the above maximal ratio combining, which is performed in the same manner for each of the embodiments, once the mobile terminal 120 transmits a data packet for reception by the base station 110, its three sectors respectively receive the transmitted (uplink) data packet via different channels, denoted herein as channels $h_1$, $h_2$, and $h_3$, such that the thus received packet data, denoted herein as packet data $y_1$, $y_2$, and $y_3$, can be represented by Expressions 1, 2, and 3, respectively, as $$y_1 = h_1 x + n_1 \qquad \text{Expression 1}$$

$$y_2 = h_2 x + n_2 \qquad \text{Expression 2}$$

$$y_3 = h_3 x + n_3 \qquad \text{Expression 3}$$

where x is the originally transmitted packet data and each of $n_1$, $n_2$, and $n_3$ is a corresponding noise component. Expressions 1, 2, and 3 can be converted to Expressions 4, 5, and 6, respectively, as $$h_1^*(y_1) = {}^*h_1^* x + h_1^*(n_1) \qquad \text{Expression 4}$$

$$h_2^*(y_2) - {}^*h_2^* x + h_2^*(n_2) \qquad \text{Expression 5}$$

$$h_3^*(y_3) = {}^*h_3^* x + h_3^*(n_3) \qquad \text{Expression 6}$$

where $h_1^*$, $h_2^*$, and $h_3^*$ are the conjugates $h_1$, $h_2$, and $h_3$, respectively. Combining Expressions 4, 5, and 6, using maximal ratio combining, obtains one received data packet y according to Expression 7 thus $$y - (^*h_1^{*2} + ^*h_2^{*2} + ^*h_3^{*2})x + Cn \qquad \text{Expression 7}$$

where Cn is the combined noise from all sectors. By thus summing the squares of the absolute values of the packet data received per sector, Expression 7 obtains a maximal ratio combining value of the packet data. Thus, the signal-to-noise ratio of the data packet y has a maximized value.

Referring to FIG. 3, the mobile terminal (UE) 120 in softer handover receives and processes the common ACK/NACK signal transmitted from the base station (Node-B) 110. That is, the mobile terminal 120 receives the ACK or NACK signal transmitted from the at least one sector of the base station 110 (S310). Rather than separately decoding the ACK/NACK signals transmitted from the respective sectors, the mobile terminal 120 preferentially performs the above-described maximal ratio combining on the received ACK/NACK signals to obtain one ACK or NACK signal having a highest signal-to-noise ratio and decodes the maximal-ratio-combined ACK or NACK signal (S320). Then, according to the decoded resultant, the mobile terminal 120 confirms the transmission status (S330), that is, whether there has been a transmission success or a transmission failure for the correspondingly transmitted data packet, and subsequently executes the appropriate transmission procedure accordingly (S340). In performing maximal ratio combining, the mobile terminal 120 obtains the value having the highest signal-to-noise ratio by combining the common ACK or NACK signals received from the at least one sector and then decodes the obtained value to determine the transmission status. Here, it is noted that the maximal ratio combining performed by the mobile terminal 120 for combining the correspondingly received common ACK/NACK signals obtains a value having the highest signal-to-noise ratio and is basically the same process as that performed by the base station 110 for combining the variously received data packets.

According to the present invention as described above, for a softer handover condition of a mobile terminal, the sectors of a base station each transmit to the mobile terminal a common ACK/NACK signal confirming the success or failure of a corresponding transmission, and the mobile terminal combines the respectively received ACK/NACK signals to obtain the value having the highest signal-to-noise ratio and decodes the obtained value to confirm transmission status, thereby reducing ACK/NACK signaling errors. Since the ACK/NACK signal can, as necessary, be transmitted to a mobile terminal in softer handover from a single sector of the base station, the present invention also enables improved channel efficiency when using a dedicated channel for ACK/NACK transmission. In addition, data transport rates can be increased due to the bases station's direct use of a physical channel for transmitting ACK/NACK signals to the mobile terminal, thereby eliminating the need to report to a higher layer, such as a radio network controller.

It will be apparent to those skilled in the art that various modifications and variations can be made in the present invention. Thus, it is intended that the present invention covers such modifications and variations provided they come within the scope of the appended claims and their equivalents.

What is claimed is:

1. A method of processing hybrid automatic repeat request (HARQ) feedback information in a mobile communication system, the method performed by a base station and comprising:
   receiving an enhanced dedicated channel (E-DCH) signal;
   decoding the received E-DCH signal; and
   transmitting two or more acknowledgment/non-acknowledgment (ACK/NACK) signals via two or more cells associated with the base station,
   wherein the two or more ACK/NACK signals have a same value.

2. The method of claim 1, wherein the E-DCH signal is received via each of the two or more cells associated with the base station.

3. A base station operated in a mobile communication system having a plurality of cells associated with the base station, the base station comprising:
   a receiver configured to receive an enhanced dedicated channel (E-DCH) signal;
   a decoder configured to decode the received E-DCH signal; and
   a transmitter configured to transmit two or more acknowledgment/non-acknowledgment (ACK/NACK) signals via two or more of the plurality of cells associated with the base station,
   wherein the two or more ACK/NACK signals have a same value.

4. The base station of claim 3, wherein the receiver is further configured to receive the E-DCH signal via each of the two or more of the plurality of cells associated with the base station.

5. A method of processing hybrid automatic repeat request (HARQ) feedback information in a mobile communication system, the method performed by a base station and comprising:
   receiving enhanced dedicated channel (E-DCH) signals via two or more cells associated with the base station;
   combining the received E-DCH signals into a combined signal;
   decoding the combined signal; and
   transmitting two or more acknowledgment/non-acknowledgment (ACK/NACK) signals via the two or more cells based on the decoding of the combined signal,
   wherein the two or more ACK/NACK signals have a same value.

6. A base station operated in a mobile communication system having a plurality of cells associated with the base station, the base station comprising:
   a receiver configured to receive enhanced dedicated channel (E-DCH) signals via two or more cells associated with the base station;
   a controller configured to combine the received E-DCH signals into a combined signal;
   a decoder configured to decode the combined signal; and
   a transmitter configured to transmit two or more acknowledgment/non-acknowledgment (ACK/NACK) signals via the two or more cells based on the decoding of the combined signal,
   wherein the two or more ACK/NACK signals have a same value.

* * * * *